US009929886B2

(12) United States Patent
Amadjikpe et al.

(10) Patent No.: US 9,929,886 B2
(45) Date of Patent: Mar. 27, 2018

(54) PHASED ARRAY ANTENNA CELL WITH ADAPTIVE QUAD POLARIZATION

(71) Applicant: Intel Corporation, Santa Clara, CA (US)

(72) Inventors: Arnaud Amadjikpe, Hillsboro, OR (US); Debabani Choudhury, Thousand Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/174,370

(22) Filed: Jun. 6, 2016

(65) Prior Publication Data

US 2017/0353338 A1    Dec. 7, 2017

(51) Int. Cl.
*H04L 27/20* (2006.01)
*H01Q 21/24* (2006.01)
*H01Q 21/00* (2006.01)
*H01Q 9/04* (2006.01)

(52) U.S. Cl.
CPC ........... *H04L 27/20* (2013.01); *H01Q 9/0407* (2013.01); *H01Q 21/0025* (2013.01); *H01Q 21/245* (2013.01)

(58) Field of Classification Search
CPC .. H04L 27/20; H01Q 9/0407; H01Q 21/0025; H01Q 21/245
USPC .................. 375/308, 285; 342/27, 365, 429; 455/130
See application file for complete search history.

(56) References Cited

U.S. PATENT DOCUMENTS

| 5,323,167 | A | * | 6/1994 | Peavey | ...................... G01S 3/24 342/429 |
| 5,568,158 | A | | 10/1996 | Gould | |
| 2001/0003442 | A1 | * | 6/2001 | Smith | ...................... H04B 7/10 342/365 |
| 2002/0077071 | A1 | * | 6/2002 | Williams | ............. H04B 10/532 455/130 |

(Continued)

FOREIGN PATENT DOCUMENTS

| CN | 103703620 A | 4/2014 |
| EP | 2738870 A2 | 6/2014 |

(Continued)

OTHER PUBLICATIONS

Schulwitz, Lora et al. "A Compact Dual-Polarized Multibeam Phased-Array Architecture for Millimeter-Wave Radar.", IEEE Transactions on Microwave Theory and Techniques, vol. 53, No. 11, Nov. 2005. pp. 3588-3594.

(Continued)

*Primary Examiner* — Chieh M Fan
*Assistant Examiner* — Fitwi Hailegiorgis
(74) *Attorney, Agent, or Firm* — Eschweiler & Potashnik, LLC

(57) ABSTRACT

A transceiver includes a vector modulator and a phased array antenna including a plurality of quad polarization antenna cells. The vector modulator is configured to modify an information signal to generate two excitation signals based on a selected polarization. The polarization is selected as one of at least vertical, horizontal, right hand circular, and left hand circular. The vector modulator is configured to drive at least one of the quad polarization antenna cells with the two excitation signals to achieve the selected polarity.

21 Claims, 10 Drawing Sheets

(56) References Cited

U.S. PATENT DOCUMENTS

| | | | |
|---|---|---|---|
| 2013/0057449 A1 | 3/2013 | Orihashi et al. | |
| 2015/0108210 A1* | 4/2015 | Zhou | H03H 7/18 235/375 |
| 2016/0139254 A1* | 5/2016 | Wittenberg | G01S 7/354 342/27 |

FOREIGN PATENT DOCUMENTS

| | | |
|---|---|---|
| WO | 2009/098713 A2 | 8/2009 |
| WO | 2013/092821 A1 | 6/2013 |

OTHER PUBLICATIONS

Yonekubo, Hiroshi et al. "Development of Dual-Polarization Phased-Array Weather Radar." Toshiba Corporation. 1 page.
Hall, P.S. "Application of sequential feeding to wide bandwidth, circularly polarised microstrip patch arrays." IEE Proceedings, vol. 136, Pt. H. No. 5, Oct. 1989. pp. 390-398.
Bauer, Rudolph L. et al. "Axial Ratio of Balanced and Unabalaced Fed Circularly Polarized Patch Radiator Arrays." 1987 IEEE. AP07-2. pp. 286-289.
Hall, P.S, et al. "Design principles of sequentially fed, wide bandwidth, circularly polarised microstrip antennas." IEE Proceedings, vol. 136, Pt. H., No. 5, Oct. 1989. pp. 381-389.
Dorsey, William Mark. "Low Profile, Printed Circuit, Dual-Band, Dual-Polarized Antenna Elements and Arrays." William Mark Dorsey 2009. 283 pages.
International Search Report dated Aug. 2, 2017 for International Application PCT/US2017/030987.

\* cited by examiner

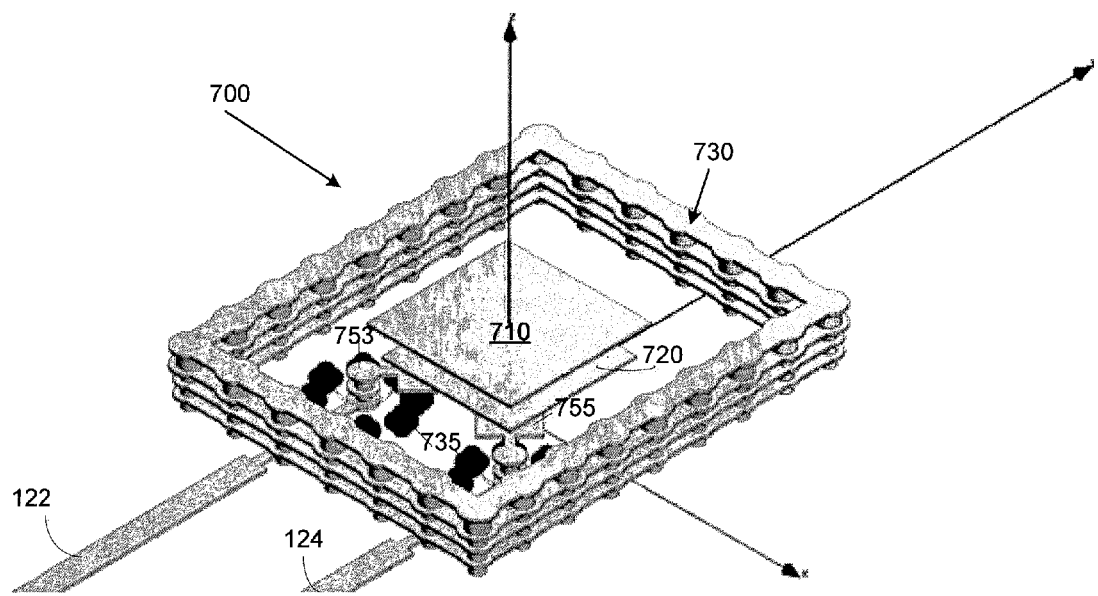
FIG. 7
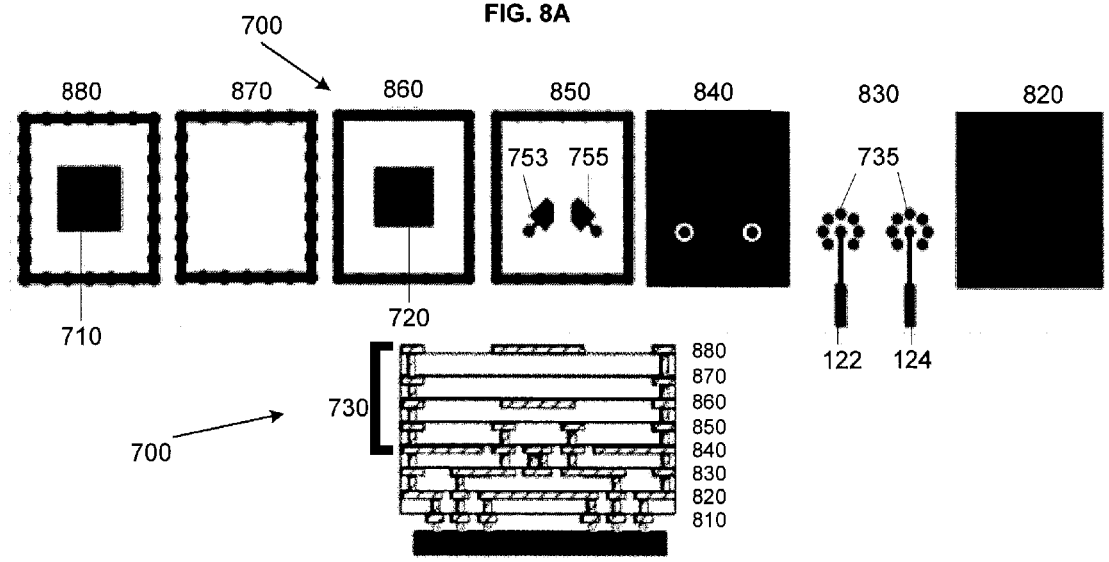
FIG. 8A
FIG. 8B

PHASED ARRAY ANTENNA CELL WITH ADAPTIVE QUAD POLARIZATION

FIELD

The present disclosure relates to the field of phased array antennas and in particular to methods and apparatus for polarizing a radio frequency (RF) signal.

BACKGROUND

The polarization of a radio wave is the orientation of the electric field of the radio wave with respect to the earth's surface. To maximize the strength of a radio wave that is received by a receiver, the polarization of the wave should match the polarization of the receiver. To this end, radio waves are typically transmitted using a polarization that is selected to match the polarization of the receiving device. However, as the radio wave travels it is scattered off obstacles which cause the polarization of the radio wave to change. This means that the radio wave should not necessarily be transmitted at the same polarization as the receiver, but rather should be transmitted at a polarization that, after traveling through the channel, results in the proper polarization at the receiver. Likewise, a polarization matching mechanism may be enabled at the receiver end to maximal signal strength. When the transmitter and/or receiver are moving, as with user end (UE) devices such as smart phones and tablets, the obstacles in the channel change as do the effects of the channel on the radio wave's polarization. Continuous adjustments to the polarization of the transmitting (or receiving) antenna may be beneficial to maintain strong signal reception from the antenna of a moving device.

BRIEF DESCRIPTION OF THE DRAWINGS

Some examples of circuits, apparatuses and/or methods will be described in the following by way of example only. In this context, reference will be made to the accompanying Figures.

FIG. 7 is a perspective view of a quad polarization antenna cell according to one embodiment of the disclosure.

FIG. 8A illustrates a set of layers that make up the quad polarization antenna cell of FIG. 7.

FIG. 8B illustrates a layer stack up of the layers of FIG. 8A.

DETAILED DESCRIPTION

Phased array antennas include multiple antennas that each transmits and receives complex weighted versions of the same RF signal. The relative amplitudes and phases of the RF signals transmitted/received by the various antennas are set in such a way that the power of the combined RF signal transmitted/received by all the antennas in the array is maximized in a desired direction while the signal power is reduced in other directions.

Wireless technology is moving toward higher frequency and wider bandwidths, which means that wavelengths are shrinking into the millimeter range. This smaller wavelength presents many challenges to providing reliable wireless links for UE access applications using phased array antennas. For example, the smaller wavelengths mean that wireless links are more susceptible to polarization mismatch and multipath fading.

Another contemporary trend in wireless communication is beamforming or "steering" of a transmitted/received RF signal using phased array antennas. Beamforming is accomplished by controlling the relative amplitude and phase of the RF signal transmitted/received by each antenna in the phased array to create a pattern of constructive and destructive interference in the combined RF signal. In this manner, the directionality of the array (i.e., the steering angle) can be changed. Cross polarization increases as the steering angle increases, meaning that cross polarization may limit the steering angle that can be effectively accomplished by a phased array antenna.

Figure 1:
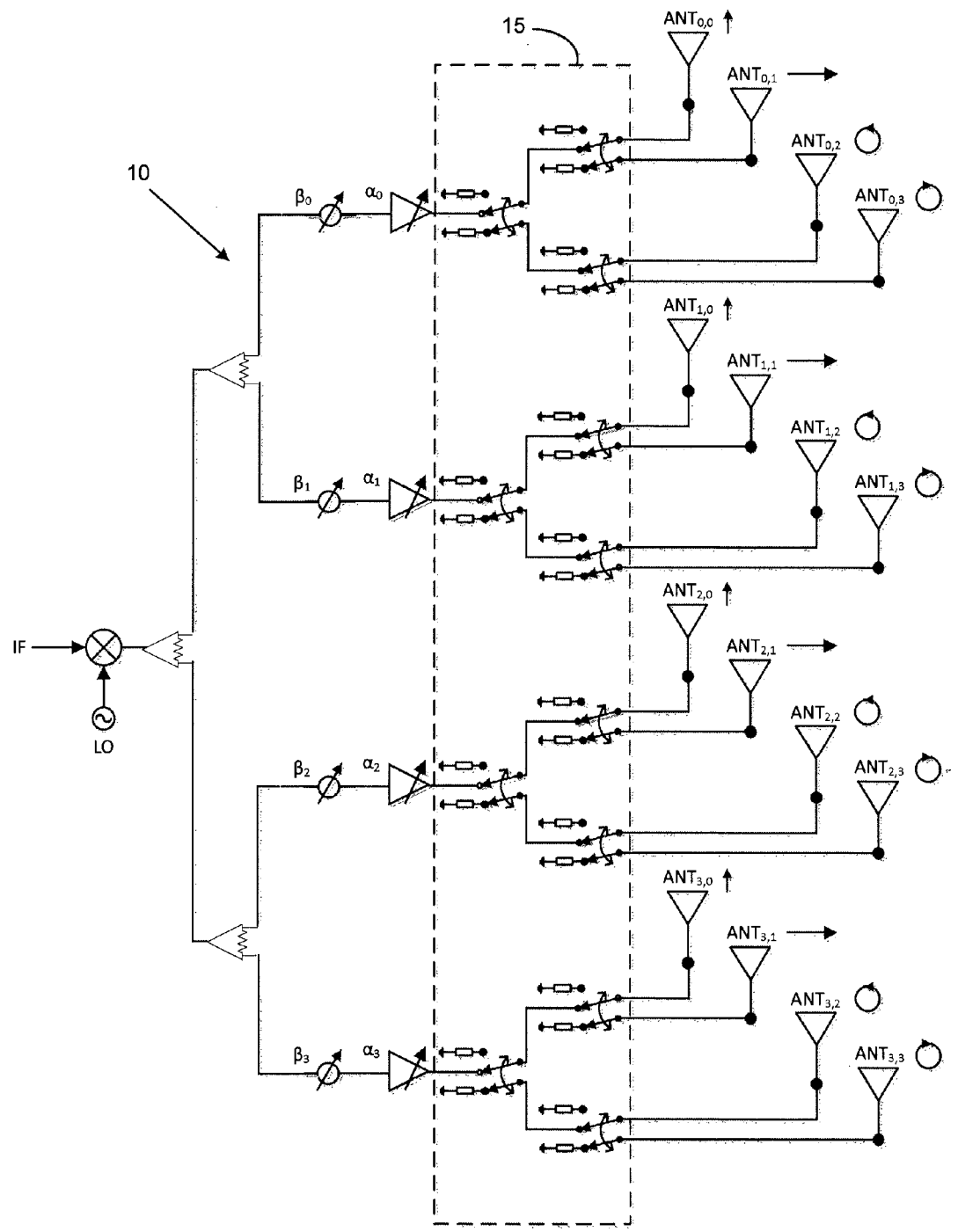
FIG. 1 illustrates an example phased array antenna that polarizes an RF signal according to one of four different polarizations utilizing single pole double throw switches.

FIG. 1 illustrates a phased array antenna 10 that achieves adaptive polarization. The phased array antenna 10 uses groups of separate antennas, with each antenna in a group having a dedicated polarization. In this paradigm, absorptive RF switches 15 are utilized to switch a transmitter front end to either a linear vertical ($V_{pol}$), linear horizontal ($H_{pol}$), left-hand circular ($LHCP_{pol}$), or right-hand circular ($RHCP_{pol}$) polarization antenna by selecting one of the antennas in a group. Without loss of generality, a similar topology may be implemented in a receiver. One benefit of this topology is that the different polarization antennas are isolated and have excellent polarization purity. However, for a 4-chain phased array, a total of 12 single pole double throw (SPDT) switches are required to switch between the different antennas. SPDT switches in RF CMOS and SiGe technologies are lossy, especially at mm-wave frequencies. It is therefore not efficient to use many switches in the front end.

RF switch isolation is another parameter that impacts the overall cross polarization discrimination (XPD) of this array architecture. The SPDT switch topology shown in FIG. 1 is not suitable for wide angle scanning phased array applications because co-polarized antenna elements may not be spatially combined without grating lobes, assuming adjacent elements with different polarization setting are separated by one half wavelength spacing in free space. Finally, the size of the group of separate polarization antennas is very large; up to 16 antenna elements with 1 polarization per element (1:1 ratio) are needed for a 4-chain phased array topology. That precludes this approach from being used for UE applications.

To reduce the number of antennas and therefore the phased array antenna form factor, one technique is to use dual polarized antenna elements. A dual polarized antenna element with two feeding ports is designed to achieve either both $V_{pol}$ and $H_{pol}$ polarizations, or both $LHCP_{pol}$ and $RHCP_{pol}$ polarizations. The dual polarized antenna elements may be either driven by independent RF chains or switched. One advantage of this topology is that the number of antenna elements is reduced by half. Dual polarization antenna elements are traditionally designed with high XPD. In general, the quality factor (inverse of bandwidth) and XPD for micro-strip antennas increases with thinner substrates. Balanced feeds at opposite radiating edges of a rectangular patch are effectively used to increase the linear XPD, at the expense of increased feed lines loss and antenna size.

For circularly polarized antennas, one effective technique to enhance XPD uses sequentially rotated feeds or arrays. Nonetheless, prior art dual polarized antennas only cover limited scanning range phased arrays. One known dual linear polarized X-band phased array weather radar is capable of 30 dB linear XPD over ±30°. However, the linear XPD degrades to 20 dB at ±60° limits. One known wide band (16%) mm-wave phased array is capable of 20 dB XPD over ±24.5°. One known dual circular polarized 2.4 GHz phased array is reported to achieve 20 dB circular XPD (or 2 dB axial ratio) over a limited ±45° scanning range. These antennas do not provide sufficient XPD to make them applicable to wide steering angle and wide band use.

The present disclosure concerns a dual-fed stacked square patch antenna array unit cell (hereinafter "quad polarization antenna cell") that is driven from both diagonals with in-phase, anti-phase or quadrature phase excitation to select between four polarization states (linear vertical, linear horizontal, left hand circular, and right hand circular) while significantly suppressing cross polarization radiation over a ±60° wide steering range. The two excitation feeds' relative phase and amplitude are controlled by means of a phase shifter and a variable gain amplifier, thus removing the need for RF polarization control switches in the radio front end. The feeding mechanism described herein for a 12% fractional bandwidth antenna array has been shown to suppress linear cross polarization radiation by more than 30 dB (across the 3-dB beam width) over a ±60° steering range. Likewise, the circular cross polarization suppression is higher than 20 dB (across the 3-dB beam width) over a ±60° steering range.

The disclosed quad polarization antenna cell embodiments enable simultaneous adaptive polarization and aperture scaling for spatial multiplexing in context of single and multi-user MIMO arrays. Apertures made up of multiple subarrays blocks with various (up to four) polarizations may be adaptively formed within a larger phased array system (at a base station for instance) to establish the optimum link to each UE. Further, the subarrays blocks may subsequently be reconfigured both in aperture and polarization over time to adapt to changes in dynamic propagation channels.

The relative phase and amplitude of the two excitation feeds for the quad polarization antenna cell are controlled by means of a phase shifter and a variable gain amplifier, thus removing the need for RF polarization control switches in the transceiver front end. Conventional wide band dual linear polarization patch arrays suffer from degraded cross polarization suppression beyond ±30°, where the XPD is at best 20 dB. The feeding mechanism described herein for a 12% fractional bandwidth antenna array has been shown to suppress linear cross polarization radiation by more than 30 dB (across the 3-dB beam width) over a ±60° steering range, thus providing high polarization purity. Likewise, the circular polarization axial ratio has been shown to be lower than 2 dB (across the 3-dB beam width) over a ±60° steering range. This is equivalent to 20 dB circular cross polarization suppression.

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a computer-related entity, hardware, software (e.g., in execution), and/or firmware. For example, circuitry or similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 2A:
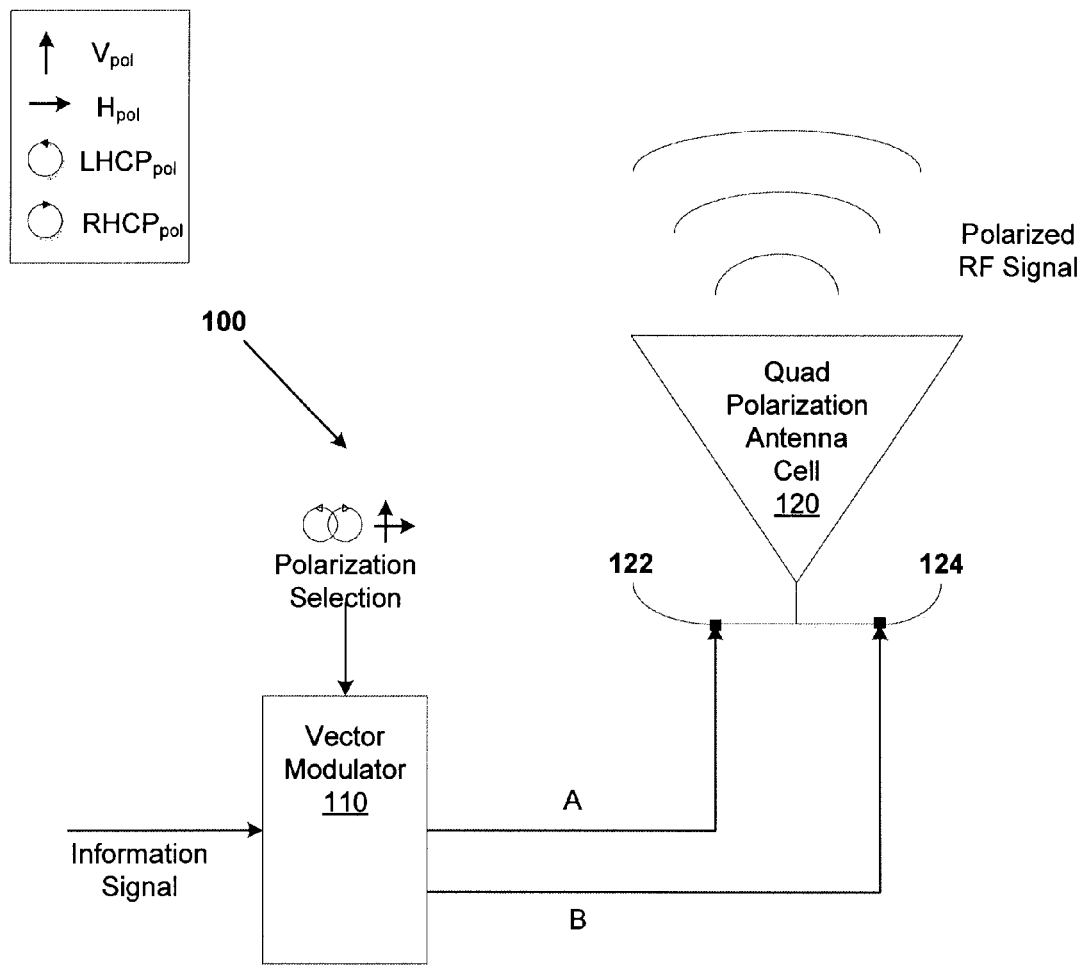
FIG. 2A illustrates an example phased array antenna that polarizes an RF signal according to one of at least four different polarizations according to one embodiment of the disclosure.

FIG. 2A illustrates a block diagram of a phased array antenna 100 that adaptively polarizes a transmitted RF signal. The antenna 100 includes a vector modulator 110 and an array of quad polarization antenna cells 120 (a single cell 120 is illustrated in FIG. 2A for simplicity). An information signal (e.g., from an intermediate frequency (IF) chain) and a polarization selection signal are input to the vector modulator 110. The data being communicated by the transmitted RF signal is modulated onto an RF signal to generate the information signal. Thus, the information signal encodes the information signal (e.g., voice, data, and so on) being transmitted to the intended receiver. The polarization selection signal selects one of at least four possible polarizations (e.g., linear vertical, linear horizontal, left hand circular, and right hand circular).

In response to the polarization selection signal, the vector modulator 110 modifies a phase and amplitude of the information signal based at least on the selected polarization to generate two excitation signals A, B. The excitation signals are applied to ports 122, 124, respectively, of the quad polarization antenna cell 120 to drive the cell to transmit/receive an RF signal that is polarized according to the selected polarization. The quad polarization antenna cell is capable of polarizing an RF signal according to at least four polarizations: linear vertical, linear horizontal, left hand circular, and right hand circular. In one embodiment, the quad polarization antenna cell 120 is capable of elliptical or oblique polarization at any desired angle (see FIG. 10 and Table 1). In one embodiment, the excitation signals A, B are applied simultaneously to the ports 122, 124.

Figure 2B:
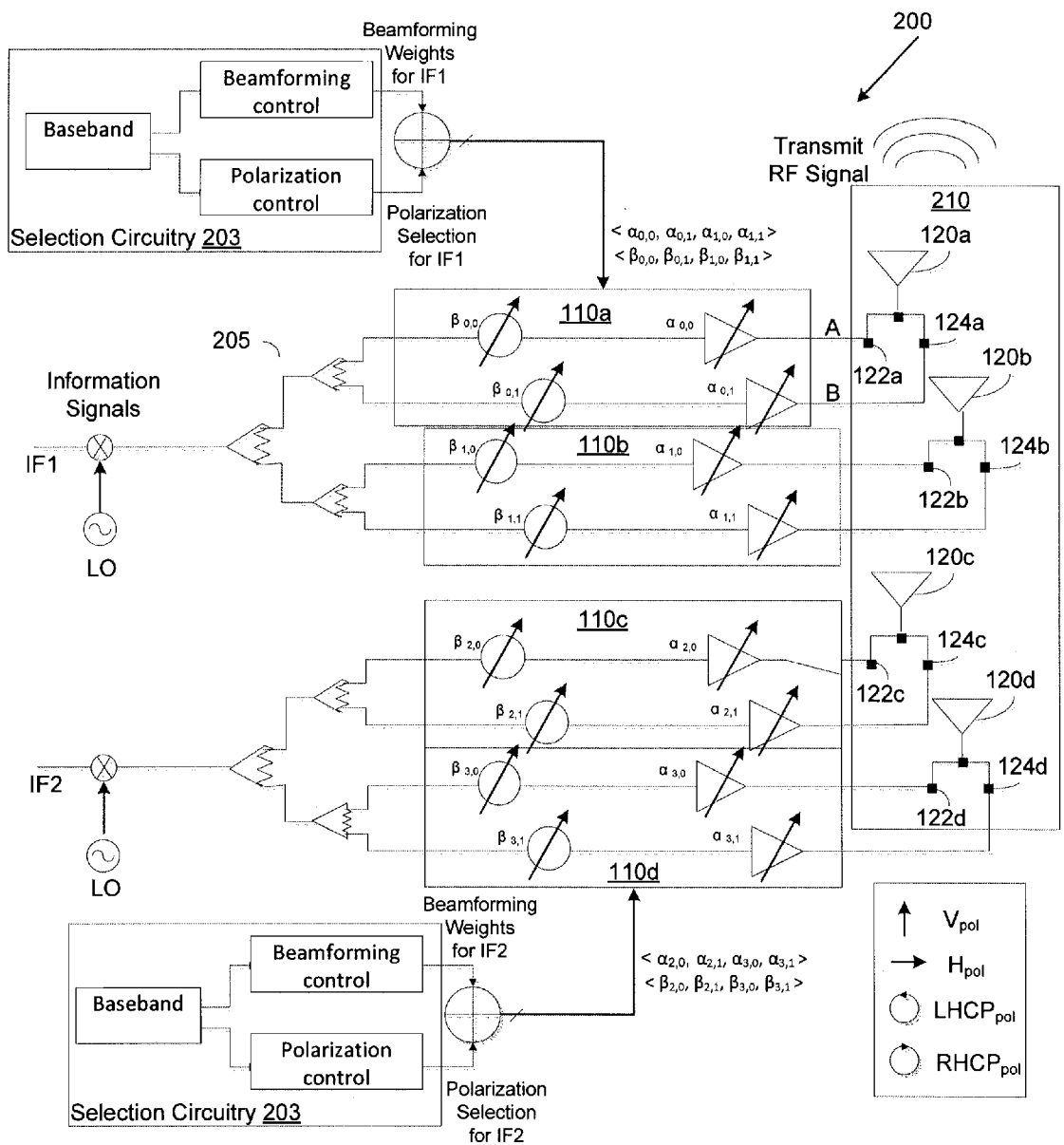
FIGS. 2B and 2C illustrate a simplified block diagram of a phased array antenna with quad polarization antenna cells and a vector modulator according to one embodiment of the disclosure.
Figure 2C:
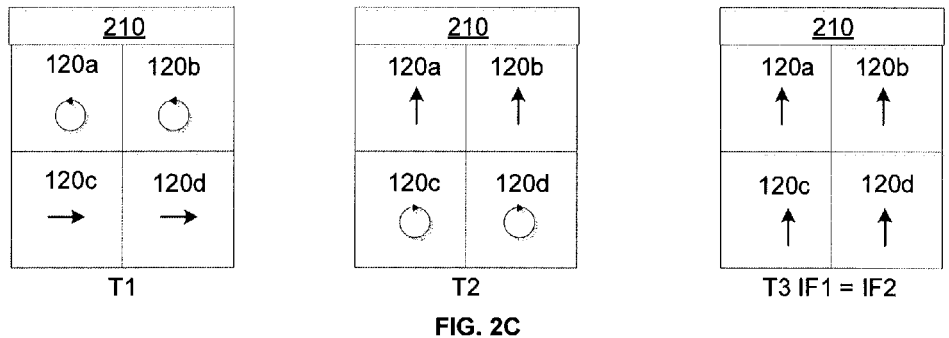

FIG. 2B illustrates one embodiment of a phased array antenna 200 that includes an array 210 of quad polarization antenna cells 120a-120d. Each quad polarization antenna cell 120 is driven by two excitation signals A, B, which are generated by an associated vector modulator 110. Each quad polarization antenna cell 120 transmits an RF signal that is polarized according to a polarization that is selected by a polarization selection signal. While only four quad polarization antenna cells are shown in FIGS. 2B and 2C, typically many more quad polarization antenna cells 120 would be present in the array, each with an associated vector modulator 110.

In the embodiment illustrated in FIG. 2B, two IF chains are shown, which each drive two quad polarization antenna cells. The quad polarization antenna cells being driven by the same IF chain will have the same polarity and beamforming weights. In other embodiments, each IF chain may drive a single quad polarization antenna cell or more than two quad polarization antenna cells, depending on the granularity with which the aperture is to be controlled, as will be discussed with reference to FIG. 4. The intermediate frequency (IF) can range from 0 Hz, in which the LO frequency and the RF frequency are the same (e.g., direct conversion transceiver), up to multiple GHz (e.g., heterodyne transceiver).

In each IF chain, the information signal is up converted to a carrier frequency by a local oscillator (LO) and is distributed to the vector modulator 110 by splitters 205. Selection circuitry 203 generates a selection signal based at least on a polarization selection signal from baseband processing for the IF chain. Each vector modulator 110 inputs two separate instances of the information signal and modifies the amplitude and phase of the information signal to generate the two excitation signals A and B. Each vector modulator 110 includes two phase shifter ($\beta$) and a variable-gain amplifier ($\alpha$) pairs. Each phase shifter/variable-gain amplifier pair modifies the information signal according to the selection signal that is input to the vector modulator 110 to generate the two excitation signals A, B. The excitation signals A, B are applied to the ports 122, 124 of each quad polarization antenna cell 120 to drive the quad polarization antenna cell to transmit a polarized RF signal.

The selection signal includes an amplitude component and a phase component. The amplitude component is used by each variable-gain amplifier in the vector modulator 110 to adjust the amplitude of the information signal. The phase component is used by the phase shifter in the vector modulator 110 to adjust the phase of the information signal. More details about the selection signal will be described later after the design of the quad polarization antenna cell is explained. In general, the two excitation signals are generated such that they are either in-phase with one another (resulting vertical polarization), anti-phase with one another (resulting in horizontal polarization) or in quadrature with respect to one another (resulting in circular polarization).

In one embodiment, the selection circuitry 203 combines beamforming weights from the baseband processing for the IF chain with the polarization selection signal to generate the selection signal provided to the vector modulator 110. In this embodiment, the vector modulator 110 also modifies the information signal according to the beamforming weights that will steer the transmit RF signal. Recall that beamforming is accomplished by adjusting the phase and amplitude of an RF signal transmitted by an antenna cell relative to the phase and amplitude of an RF signal transmitted by a neighboring antenna cell. The beamforming weights indicate relative phases and amplitudes as between different components of the information signal for a particular quad polarization antenna cell. Thus, in the embodiment shown in FIG. 2B, the same phase shifter and variable-gain amplifiers that are used to beamform the transmit RF signal are used to polarize the transmit RF signal.

Note that in addition to re-using the phase shifter and variable-gain amplifier, the phased array antenna 200 eliminates the use of RF switches to switch between single or dual polarized antenna elements. This is because each quad polarization antenna cell is capable of being polarized in any of at least four polarizations (linear vertical, linear horizontal, right hand circular, and left hand circular). Although only 2-bit phase shifters are enough to create all four polarizations (linear vertical, linear horizontal, left hand circular, and right hand circular), it may be beneficial to use 4 or 5-bit phase shifters for the sole purpose of mitigating quantization lobes that arise from use of digital phase shifters in scanning phased arrays. The additional phase shifter bits are not needed to create the four polarization states.

Referring now to FIG. 2C, a top schematic view of the antenna array 210 is shown at three different times to illustrate how polarization and aperture size can be easily changed with the described quad polarization antenna cells. At time T1, the quad polarization antenna cells 120a, 120b connected to IF chain IF1 have a left hand circular polarity and the quad polarization antenna cells 120c, 120d connected to IF chain IF2 have a horizontal polarity. At time T2, the quad polarization antenna cells connected to IF1 are changed to a vertical polarity and the quad polarization antenna cells connected to IF2 are changed to a right hand circular polarity. At time T3, to increase the aperture size from two quad polarization antenna cells per aperture to a single aperture with four quad polarization antenna cells, IF1 and IF2 are driven with the same information signal and both pairs of quad polarization antenna cells 120a, 120b and 120c, 120d are driven to provide a vertical polarization.

Figure 3:
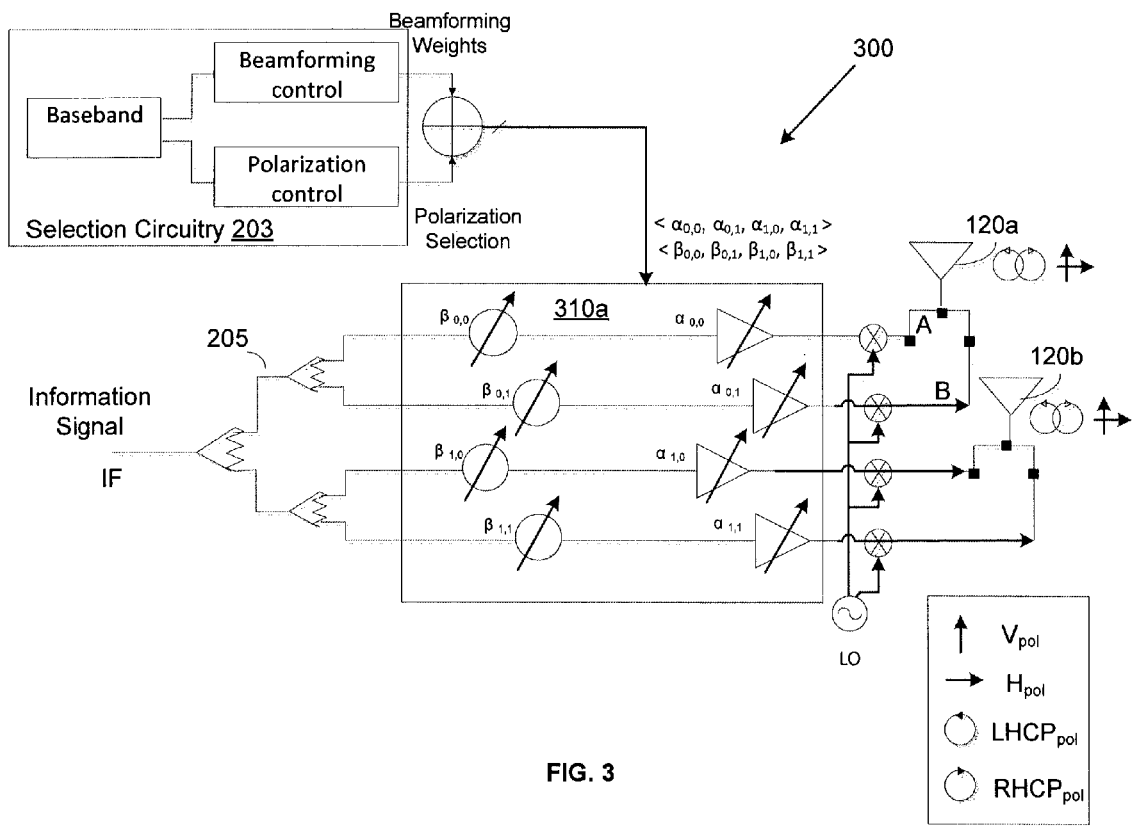
FIG. 3 illustrates a simplified block diagram of a phased array antenna with quad polarization antenna cells and a vector modulator according to another embodiment of the disclosure.

The polarization purity of each polarization state is sensitive to the accuracy of the phase shifters and variable-gain amplifiers. FIG. 3 illustrates an embodiment of a phased array antenna 300 that addresses this issue. The phased array antenna 300 includes vector modulators 310 that operate in the intermediate frequency. The excitation signals produced by the vector modulators 310 are up converted to the carrier frequency by the local oscillator. By moving the vector modulators 110 into the intermediate frequency as opposed to carrier wave frequency, the design is simplified. For example, the variable gain amplifiers and phase shifters may be less tightly specified and therefore have lower cost. Note that phase shifting may also be accomplished at the local oscillator in another embodiment.

While the embodiments herein will be described mainly in the context of the transmitter aspect of a transmitter, the antenna is, of course, reciprocal and the vector modulator 310 are configured to adjust, in a manner opposite described above with respect to generation of excitation signals, the amplitude and phase of a signal output by the quad polarization antenna cell's ports to make a receiver sensitive to the selected polarization while suppressing the other polarizations. The performance of the quad polarization antenna cell while transmitting is the same as the performance of the quad polarization antenna cell while receiving.

Figure 4:
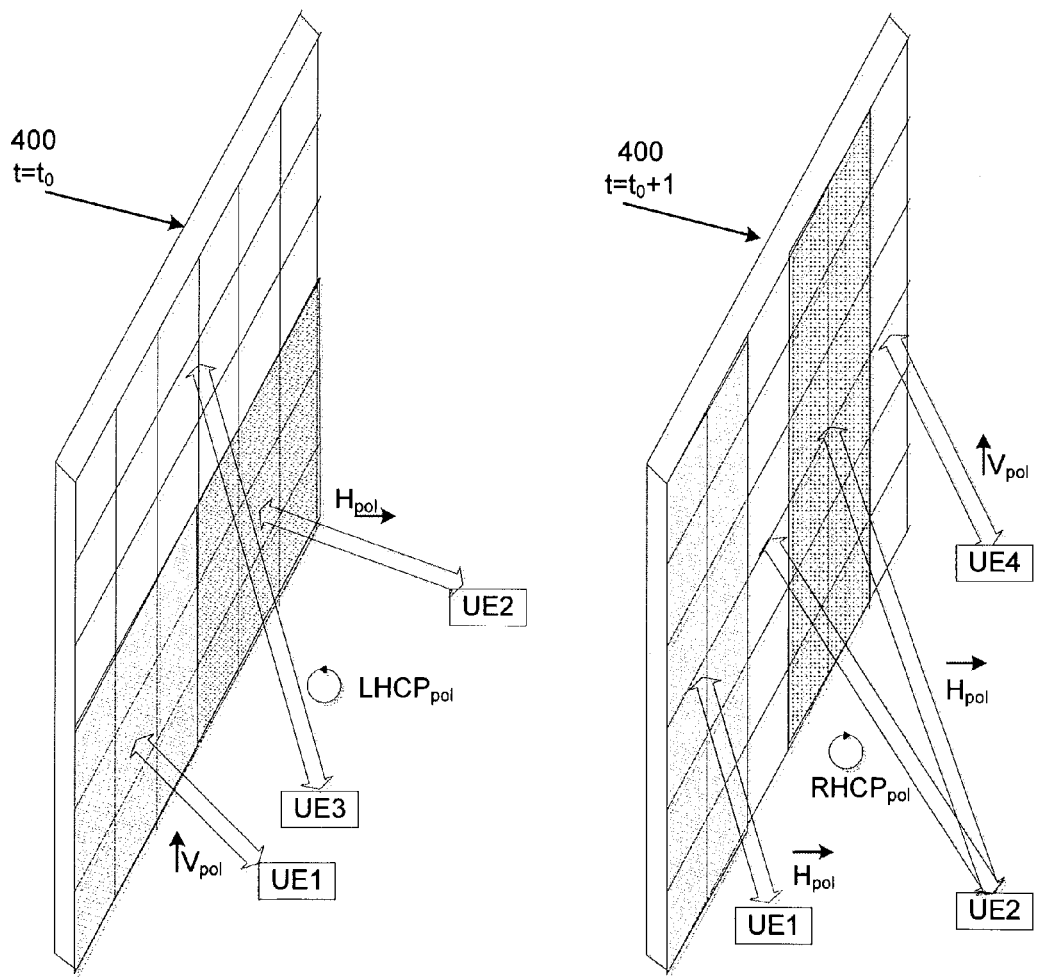
FIG. 4 illustrates schematically a phased array antenna that includes quad polarization antenna cells that provides adaptive aperture scaling and polarization according to one embodiment of the disclosure.

FIG. 4 illustrates an example embodiment of a phased array antenna 400 that uses quad polarization antenna cells (e.g., cells 120) to provide adaptive polarization and a scalable aperture. Each unit in the phased array antenna (shown schematically as a box) is associated with a single IF chain and includes some number of quad polarization antenna cells. Recall that in FIG. 2B two quad polarization antenna cells were connected to each IF chain, while any number of quad polarization antenna cells could be connected to an IF chain. At time $t_0$, the phased array antenna 400 has been configured to have three apertures. A first aperture is vertically polarized and is beamforming to form a link with UE1. The subarray of fifteen IF chains in the first aperture (IF0,0 to IF2,5) are all driven with the information signal for UE1 and a selection signal that combines the polarization selection signal of vertical and the beamforming weights for the UE1 signal. If each IF chain is connected to two quad polarization antenna cells, then the UE1 signal is being transmitted by 15*2 or 30 quad polarization antenna cells.

Likewise, at time $t_0$, the second aperture is horizontally polarized and beamforming to form a link with UE2. A third aperture is twice the size (two times the number of antenna cells) and is left hand circular polarized. The third aperture beamforms to form a link with UE3.

Because of the flexibility provided by the quad polarization antenna cells, the phased array antenna 400 is dynamically reconfigurable. At time $t_0+1$, the phased array antenna includes four apertures as shown. Note that two of the apertures are forming a link with UE2 using two different polarizations (right hand circular and linear horizontal). This is accomplished by assigning two sets of IF chains to transmit the UE2 signal, with each set having the same beamforming weights but different polarization selection signals. This dual link approach may be beneficial when UE2 is moving or the optimum polarity is changing due to channel conditions. The aperture that is forming the link with UE1 has changed in size and polarity, possibly due to motion of UE1 through the coverage region of the antenna 400. A fourth aperture that is vertically polarized has been formed to form a link with UE4.

It can be seen from FIG. 4 that a phased array antenna 400 that utilizes quad polarization antenna cells is well suited for use in massive multiple input multiple output (MIMO) arrays. This is because the quad polarization antenna cell enables adaptive aperture scaling and adaptive polarization simultaneously. Any size subarray within a large array system may be dynamically formed to serve multiple links simultaneously and reconfigured to adjust to changes in a dynamic propagation channel as well as changes at the link ends.

Because a single quad polarization antenna cell can be polarized in four different polarizations, it is possible to create grating lobe free scanning subarrays with dynamically adjustable aperture size and at least four adaptive polarization states, in both azimuth and elevation. This is because the quad polarization antenna cells can be adjacent to each other (with cell-to-cell separation about half a wavelength). With single polarization or dual polarization antenna elements, some elements end up with larger spacing between elements because of the fixed nature of the polarization. These variations in separation yield grating lobes in the visible range.

Figure 5:
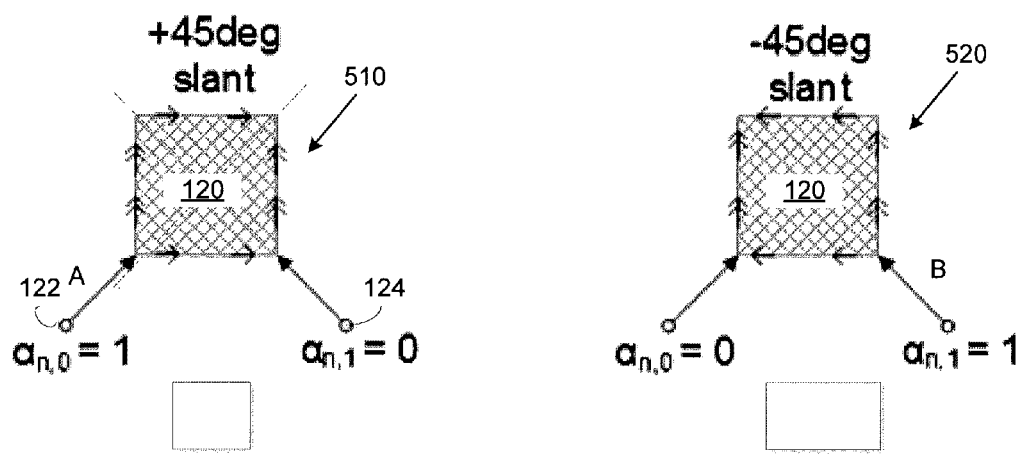
FIG. 5 illustrates a functional diagram of a square patch antenna being driven at one diagonal.
Figure 6:
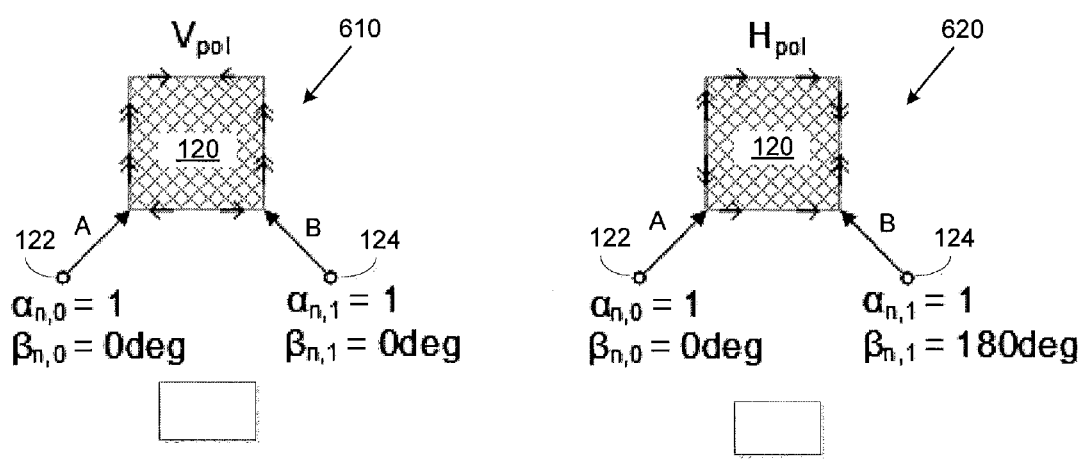
FIG. 6 illustrates a functional diagram of a square patch antenna being driven simultaneously at both diagonals.

FIGS. 5 and 6 illustrate underlying concepts for the design of the quad polarization antenna cell discussed with reference to FIGS. 1-4. In the quad polarization antenna cell, a half wavelength square patch antenna is excited along both diagonals by applying the two excitation signals A, B to the ports 122, 124 of the quad polarization antenna cell. Each individual excitation signal gives rise to a slant mode oriented at either 45 degrees or −45 degrees. In example 510 an excitation signal A is being applied to a corner of a square patch quad polarization antenna cell 120. It can be seen that the resulting polarity will be +45 degrees. Likewise in example 520, applying an excitation signal to the other diagonal results in a polarity of −45 degrees. Examples 510 and 520 show that the square patch quad polarization antenna cell 120 has currents flowing in the same direction on opposite edges in both the vertical and horizontal directions. This will result in poor cross polarization discrimination.

FIG. 6 illustrates that when the excitation signals are applied simultaneously to both diagonals (e.g., at corners of the square patch) in-phase 610 produces a linear vertical polarization. When the excitation signals are anti-phase 620 the resulting polarization is linear horizontal. It can be seen in 610 and 620 that the parasitic currents flowing on the two opposite radiating edges, which are the maximum electric field edges, cancel each other because they have opposite orientation. This simultaneous excitation of both diagonals is a mean of controlling the magnitude and phase of parasitic surface currents along the two opposite radiating edges such that the cross-polarization radiated fields cancel in the far-field. As a result, one can achieve significant cross polarization discrimination over a very wide steering angle. To achieve circular polarization, the excitations signals are in quadrature with respect to one another.

FIG. 7 illustrates a perspective view of one embodiment of a quad polarization antenna cell 700 that is configured to be driven at both diagonals with two excitation signals as described above. The quad polarization antenna cell 700 includes the ports, 122, 124 that conduct the excitation signals to the diagonals of two stacked square patch elements 710, 720 by way of capacitive edge coupling probes 753, 755. The square patch elements 710, 720 are electromagnetically coupled to one another. A grounded cavity ring 730 surrounds the quad polarization antenna cell 700 to reduce substrate mode coupling between adjacent elements and therefore mitigate scan blindness, which is a familiar problem with microstrip antennas on thick substrates. The grounded cavity ring reduces mutual coupling by shorting the substrate modes, but can negatively impact the phased antenna array's performance. A smaller cavity causes a smaller fractional bandwidth while a larger cavity means larger cell-to-cell separation. The cavity size should be chosen to produce a desired cell-to-cell spacing while suppressing substrate mode coupling and still maintaining a wide enough (e.g., around 12%) fractional bandwidth.

FIGS. 8A and 8B illustrate one example of layers and a layer stack-up that can be used to construct the quad polarization antenna cell 700. In FIG. 8A, layers 820-880 are illustrated. It can be seen that the top layer 880 includes the top square patch element 710 while the lower square patch element 720 is on layer 860. Layers 840-880 form the cavity ring as can be seen in FIG. 8B. Capacitive edge coupling probes 753, 755 are in layer 850 and the ports 122, 124 are in layer 830.

Driving the quad polarization antenna cell 700 in FIGS. 7, 8A, and 8B from both diagonals, in-phase or anti-phase significantly suppresses the cross-polarization radiation in both linear vertical and horizontal modes. It has been shown that the feeding mechanism illustrated in FIG. 6 and implemented in FIGS. 7, 8A, and 8B suppresses the cross polarization radiation by more than 30 dB across the 3-dB beam width over ±60° steering range. Conventional dual linear polarized arrays are scanned only to ±30° with 30 dB XPD. Beyond ±30°, the XPD degrades to 20 dB or worse.

Traditionally, there is a tradeoff between cross polarization radiation and bandwidth of microstrip antennas. This is because the cross polarization reduces with thinner substrates while a thicker substrate is utilized to widen the bandwidth. The simultaneously feeding of the two excitation signals as illustrated in FIG. 6 and implemented in FIGS. 7, 8A, and 8B suppresses the cross polarization significantly without sacrificing bandwidth.

Driving the stacked square patch in Figures FIGS. 7, 8A, and 8B, from both diagonals, in quadrature while balancing the two feeds amplitude with a variable gain amplifier ensures the polarization purity (that is, low axial ratio) of the circularly polarized modes. It is in fact similar to balancing I and Q vectors of coherent systems. By doing so, lower than 2 dB axial ratio can be accomplished across the 3-dB beam width of the array over ±60° steering range. Conventional dual circular polarized arrays are scanned only to ±45° with 2 dB axial ratio. 2 dB axial ratio corresponds to 20 dB circular cross polarization discrimination.

Figure 9:
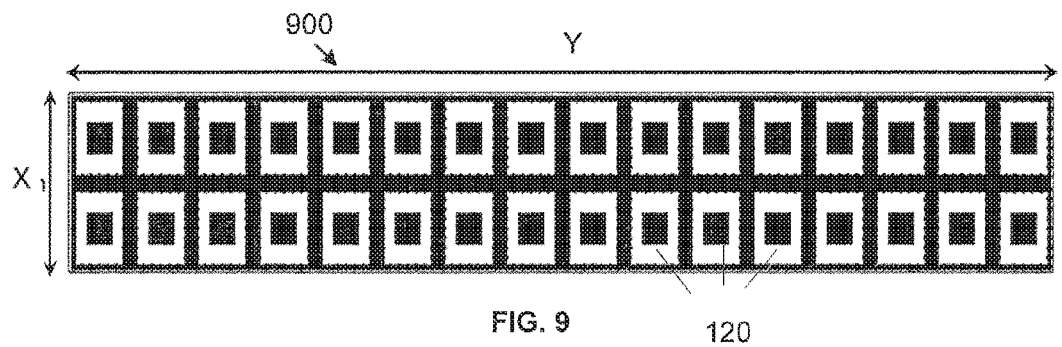
FIG. 9 illustrates a top plan view of a phased array antenna that includes 32 quad polarization antenna cells according to one embodiment of the disclosure.

FIG. 9 illustrates a top view of one embodiment of a phased array antenna 900 that utilizes the disclosed quad polarization antenna cells 120. The phased array antenna 900 is suitable for operation at 60-GHz. The phased array antenna 900 includes 2×16 quad polarization antenna cells (e.g., 32 total). In one embodiment, the dimension X is 0.6 cm and the dimension Y is 4.0 cm×0.6 cm, resulting in a form factor that may fit in handheld devices. The quad polarization antenna cells 120 are spaced 0.5λ (2.5 mm at 60 GHz) in azimuth and 0.6λ (3 mm at 60 GHz) in elevation. λ is the free space wavelength. In a variant of this topology, larger arrays may be constructed with p×q aperture, where p and q are integer greater than 2. Results of testing of the scanning performance as well as polarization discrimination of this adaptive polarization and aperture scaling phased array 900 are summarized below.

In linear vertical polarization, the cross polarization discrimination across the 3-dB beam width varies from 60 dB to 30 dB as the beam is steered from 0 to −60° in azimuth. By symmetry, the same performance is achieved over 0 to +60°. In the linear horizontal polarization, the cross polarization discrimination across the 3-dB beam width varies from 55 dB to 30 dB as the beam is steered from 0 to −60° in azimuth. By symmetry, the same performance is achieved over 0 to +60°.

In left hand circular polarization, the axial ratio across the 3-dB beam width varies from 0.8 to 1.8 dB (or 30 to 20 dB cross polarization discrimination) as the beam is steered from 0 to −60° in azimuth. By symmetry, the same performance is achieved over 0 to +60°. In right hand circular polarization, the axial ratio across the 3-dB beam width varies from 0.8 to 1.8 dB (or 30 to 20 dB cross polarization discrimination) as the beam is steered from 0 to −60° in azimuth. By symmetry, the same performance is achieved over 0 to +60°.

The low cost phased array antennas used in many application use digital phase shifters and amplitude control digital-to-analog converters (DACs) with a limited number of bits. In this context that limitation would constrain the number of achievable polarization states to a finite number. Nevertheless, two phase shifter bits are enough to create linear vertical, linear horizontal, left circular, and right hand circular polarizations, which are sufficient for most millimeter wave applications. Effectively, a quad polarization phased array antenna is achieved by using the disclosed quad polarization antenna cells.

Figure 10:
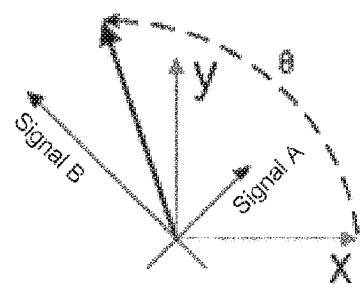
FIG. 10 illustrates a vector diagram that shows how various polarization angles may be obtained utilizing a quad polarization antenna cell according to one embodiment of the disclosure.

Combining two linear orthogonal modes in-phase (or anti-phase) with amplitude control in the variable gain amplifiers results in adaptive linear oblique polarization, as summarized in Table 1. It should be noted however that as the linearly polarized vector rotates away from either vertical or horizontal toward oblique, the cross polarization suppression degrades to about 15 dB in the slant direction. FIG. 10 shows the polarization orientation in the coordinate system. Table 1 lists the selection signal's amplitude and phase settings with corresponding polarization states of the quad polarization antenna cell 120. Recall that the selection signal is input to the vector modulator 110 (see FIGS. 2 and 3) and is used to set the gain and phase shift performed on the information signal by the two variable-gain amplifiers $\alpha_0$ and $\alpha_1$ and the two phase shifters $\beta_0$ and $\beta_1$, respectively, to the information signal.

TABLE 1

| Selection Signal | | | |
|---|---|---|---|
| Normalized amplitude pair $(\alpha_0, \alpha_1)$ | Phase pair $(\beta_0, \beta_1)$ deg | Polarization type | Polarization state/angle (deg) |
| (1, 1) | (0, 0) | linear | $V_{pol}$ – Vertical at $\theta = 90$ |
| (1, 1) | (0, 180) | linear | $H_{pol}$ – Horizontal at $\theta = 0$ |
| $(\alpha_0, \alpha_1)$ $(\alpha_0, \alpha_1) \neq (1, 1)$ | (0, 0) | linear | oblique at $\theta = 45 + \tan^{-1}\left(\frac{\alpha_1}{\alpha_0}\right)$ |
| $(\alpha_0, \alpha_1)$ $(\alpha_0, \alpha_1) \neq (1, 1)$ | (0, 180) | linear | oblique at $\theta = 45 - \tan^{-1}\left(\frac{\alpha_1}{\alpha_0}\right)$ |
| (1, 1) | (0, 90) | circular | $LHCP_{pol}$ |
| (1, 1) | (0, −90) | circular | $RHCP_{pol}$ |
| else | else | elliptical | LH or RH elliptical |

It can be seen from Table 1 that, when the selected polarization is vertical, the vector modulator generates a first excitation signal corresponding to the information signal and a second excitation signal corresponding to the information signal. As such there is no phase or amplitude difference between the two excitation signals (the excitation signals are in-phase. When the selected polarization is horizontal, the vector modulator generates a first excitation signal corresponding to the information signal; and a second excitation signal corresponding to the information signal phase shifted by 180 degrees. As such, the excitation signals have the same relative amplitude but are anti-phase with respect to one another.

When the selected polarization is $$45 + \tan^{-1}\left(\frac{\alpha_1}{\alpha_0}\right),$$

the vector modulator generates a first excitation signal corresponding to the information signal having a normalized amplitude of $\alpha_0$ and a second excitation signal corresponding to the information signal having a normalized amplitude of $\alpha_1$. As such, the excitation signals have different amplitudes but are in phase with respect to one another. When the selected polarization is $$45 - \tan^{-1}\left(\frac{\alpha_1}{\alpha_0}\right),$$

the vector modulator generates a first excitation signal corresponding to the information signal having a normalized amplitude of $\alpha_0$ and a second excitation signal corresponding to the information signal having a normalized amplitude of $\alpha_1$ and phase shifted by 180 degrees. As such, the excitation signals have different amplitudes and are anti-phase with respect to one another.

When the selected polarization is left hand circular, the vector modulator generates a first excitation signal corresponding to the information signal; and a second excitation signal corresponding to the information signal phase shifted by +90 degrees. As such, the excitation signals have the same relative amplitude but are in quadrature with respect to one another. When the selected polarization is right hand circular, the vector modulator generates a first excitation signal corresponding to the information signal; and a second excitation signal corresponding to the information signal phase shifted by −90 degrees. As such, the excitation signals have the same relative amplitude but are in quadrature with respect to one another.

Figure 11:
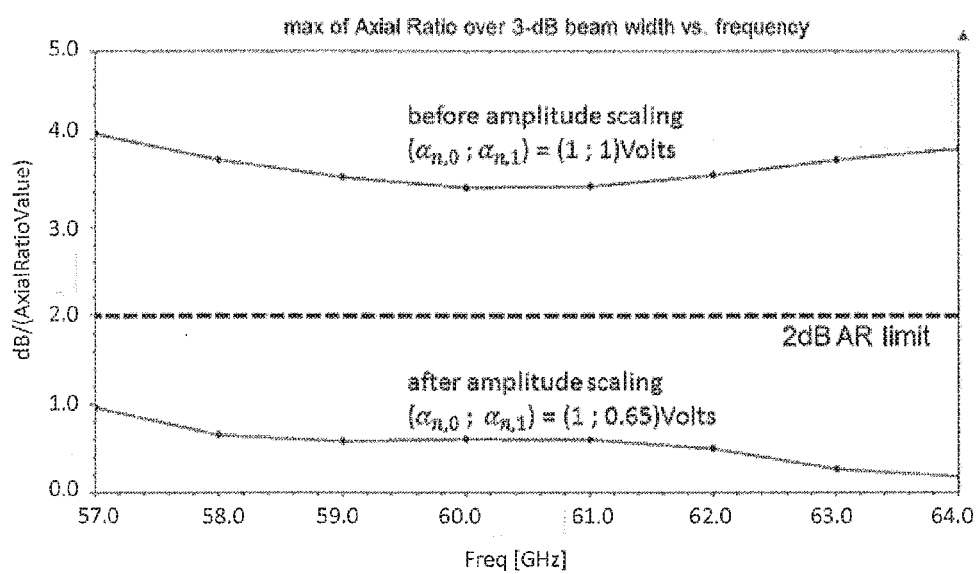
FIG. 11 illustrates a plot that shows the improvement in axial ratio gained from scaling the relative amplitude of excitation signals according to one embodiment of the disclosure.

As indicated in FIG. 11, properly scaling the relative amplitude of the quadrature driven dual-fed element ensures a low and flat axial ratio response (in circular polarization mode) over the large 12% bandwidth. This degree of freedom to scale the weights of the quadrature driven feeds dual-fed element is a key advantage over circular polarization elements with single feed. A factory calibration procedure would be run to calculate adequate scaling weights just as it would be done to compute the code book for beam steering phased arrays.

Figure 12:
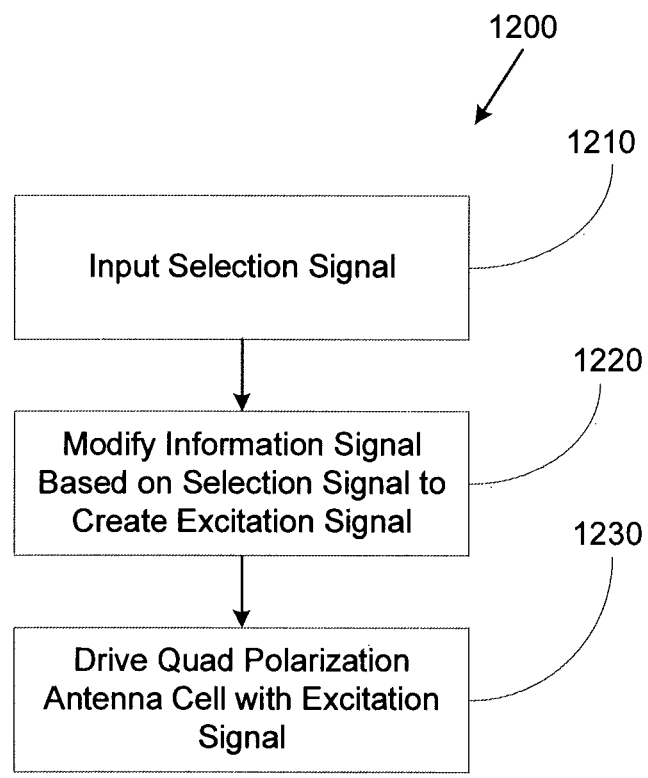
FIG. 12 illustrates a flowchart that outlines a method for driving a quad polarization antenna cell according to one embodiment of the disclosure.

FIG. 12 depicts a flowchart outlining one embodiment of a method 1200 for driving a quad polarization antenna cell. The method 1200 may be performed, for example, by the vector modulator of FIGS. 1-4. The method includes, at 1210, inputting a selection signal, wherein the selection signal is associated with a polarization selected from at least vertical, horizontal, right hand circular, and left hand circular polarization. At 1220 an information signal is modified based at least on the selection signal to generate an excitation signal. The information signal encodes information being communicated to an intended receiver of the RF signal transmitted by the quad polarization antenna cell. At 1230 the method includes driving the quad polarization antenna cell with the excitation signal to cause the quad polarization antenna cell to transmit/receive an RF signal that is polarized according to the selected polarization.

In one embodiment the method includes modifying the information signal based on beamforming weights to generate the excitation signal.

In one embodiment, the selection signal comprises a first gain value and first phase shift value and a second gain value and a second phase shift value. In this embodiment, the method includes adjusting the phase and amplitude of a first instance of the information signal according to the first gain value and the first phase shift value to generate a first excitation signal. The method also includes adjusting the phase and amplitude of a second instance of the information signal according to the second gain value and the second phase shift value to generate a second excitation signal. The method includes driving the quad polarization antenna cell with the first excitation signal and the second excitation signal simultaneously.

In one embodiment, the method includes driving the quad polarization antenna cell by applying the first excitation signal to a first port of the quad polarization antenna cell and applying the second excitation signal to a second port quad polarization antenna cell, wherein the first port and the second port are electrically coupled to adjacent corners of a square patch element in the quad polarization antenna cell.

It can be seen that for spatial multiplexing in context of massive MIMO arrays, the disclosed quad polarization antenna cell enables simultaneous adaptive polarization and aperture scaling. Multiple subarrays blocks with various (up to four) polarizations may be adaptively formed within a larger array system (at a base station for instance) to establish the optimum link to each UE. The subarrays blocks may subsequently be reconfigured both in aperture and polarization over time to adapt to changes in dynamic propagation channels. The quad polarization antenna cell also reduces the form factor of the fully adaptive polarization phased antenna array, compared to conventional approaches that utilize dedicated elements per polarization (four single-pol elements to cover four polarizations) or dedicated elements per polarization pair (two dual-pol elements to cover four polarizations). This size reduction facilitates integration of the adaptive quad polarization array into mobile UE devices including but not limited to smartphones, tablets, and virtual reality (VR) devices.

The disclosed quad polarization antenna cell is well suited for use in the next generation mm-wave and 5G radios, for backhaul, fronthaul, access and other applications. As indicated earlier, the disclosed phased array antenna features simultaneous adaptive quad polarization and adaptive aperture scaling to mitigate polarization mismatch, multipath fading, interference, and to provide polarization diversity through mm-wave wireless communication links. This results in more robust and reliable mm-wave communication links, which is important for the application of mm-wave technology to consumer market applications.

Figure 13:
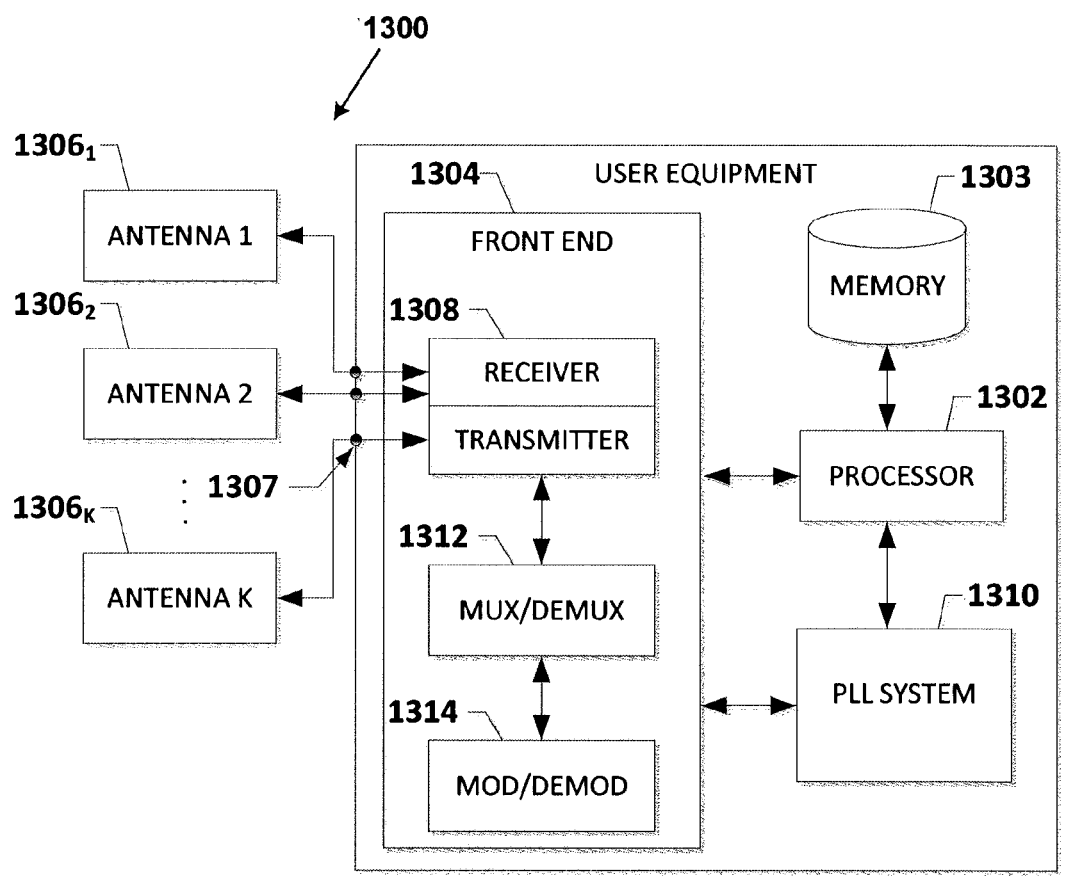
FIG. 13 illustrates a block diagram of an embodiment of user equipment 1300 (e.g., a mobile device, communication device, personal digital assistant, etc.) that can enable and/or exploit features or aspects of the disclosed aspects.

To provide further context for various aspects of the disclosed subject matter, FIG. 13 illustrates a block diagram of an embodiment of user equipment 1300 (e.g., a mobile device, communication device, personal digital assistant, etc.) related to access of a network (e.g., base station, wireless access point, femtocell access point, and so forth) that can enable and/or exploit features or aspects of the disclosed aspects.

The user equipment or mobile communication device 1300 can be utilized with one or more aspects of the quad polarization phased array antenna cells and/or vector modulators described herein according to various aspects. The user equipment device 1300, for example, comprises a digital baseband processor 1302 that can be coupled to a data store or memory 1303, a front end 1304 (e.g., an RF front end, an acoustic front end, or the other like front end) and a plurality of antenna ports 1307 for connecting to a plurality of antennas $1306_1$ to $1306k$ (k being a positive integer). The antennas $1306_1$ to $1306k$ can receive and transmit signals to and from one or more wireless devices such as access points, access terminals, wireless ports, routers and so forth, which can operate within a radio access network or other communication network generated via a network device (not shown). The antennas $1306_1$ to $1306k$ include a plurality of the quad polarization phased array antenna cells described herein.

The user equipment 1300 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more communication protocols or standards.

The front end 1304 can include a communication platform, which comprises electronic components and associated circuitry that provide for processing, manipulation or shaping of the received or transmitted signals via one or more receivers or transmitters (e.g. transceivers) 1308, a mux/demux component 1312, and a mod/demod component 1314. The front end 1304 is coupled to the digital baseband processor 1302 and the set of antenna ports 1307, in which the set of antennas $1306_1$ to $1306k$ can be part of the front end. In one aspect, the front end 1304 includes vector modulators configured to generate excitation signals to that cause an information signal to be transmitted with a selected polarization according to aspects disclosed herein.

The processor 1302 can confer functionality, at least in part, to substantially any electronic component within the mobile communication device 1300, in accordance with aspects of the disclosure. As an example, the processor 1300 can be configured to execute, at least in part, executable instructions that select a gain and phase shift of the vector modulators of FIGS. 2A, 2B, and 3. The processor 1302 is functionally and/or communicatively coupled (e.g., through a memory bus) to memory 1303 in order to store or retrieve information necessary to operate and confer functionality, at least in part, to communication platform or front end 1304, a phase locked loop system 1310.

The processor 1302 can operate to enable the mobile communication device 1300 to process data (e.g., symbols, bits, or chips) for multiplexing/demultiplexing with the mux/demux component 1312, or modulation/demodulation via the mod/demod component 1314, such as implementing direct and inverse fast Fourier transforms, selection of modulation rates, selection of data packet formats, inter-packet times, etc. Memory 1303 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation. Memory 1303 may store information used to generate excitation signals based on a selected polarization.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Examples

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Example 1 is a transceiver including: a vector modulator configured to modify an information signal to generate a plurality of excitation signals based on a selected polarization, wherein the polarization is selected as one of at least vertical, horizontal, right hand circular, or left hand circular; and a phased array antenna having a plurality of quad polarization antenna cells configured to, when excited by the plurality of excitation signals, transmit the information signal such that the transmitted information signal has the selected polarization state.

Example 2 includes the subject matter of example 1, including or omitting optional elements, wherein the vector modulator is configured to modify the information signal based on a beamforming signal to generate the plurality of excitation signals.

Example 3 includes the subject matter of example 1, including or omitting optional elements, wherein the vector modulator comprises a plurality of phase shifter-variable gain amplifier pairs, wherein each phase shifter-variable gain amplifier pair modifies an instance of the information signal to generate one of the plurality of excitation signals.

Example 4 includes the subject matter of examples 1, 2, and 3, including or omitting optional elements wherein the vector modulator is further configured to operate at an RF frequency of the transmitter.

Example 5 includes the subject matter of examples 1, 2, and 3, including or omitting optional elements, wherein the vector modulator is further configured to operate at an IF frequency of the transmitter.

Example 6 includes the subject matter of examples 1, 2, and 3, including or omitting optional elements, wherein the vector modulator is configured to, when the selected polarization is vertical: generate a first excitation signal corresponding to the information signal; and generate a second excitation signal corresponding to the information signal.

Example 7 includes the subject matter of examples 1, 2, and 3, including or omitting optional elements, wherein the vector modulator is further configured to, when the selected polarization is horizontal: generate a first excitation signal corresponding to the information signal; and generate a second excitation signal corresponding to the information signal phase shifted by about 180 degrees.

Example 8 includes the subject matter of examples 1, 2, and 3, including or omitting optional elements, wherein the vector modulator is configured to, when the selected polarization is left hand circular: generate a first excitation signal corresponding to the information signal; and generate a second excitation signal corresponding to the information signal phase shifted by about 90 degrees.

Example 9 includes the subject matter of examples 1, 2, and 3, including or omitting optional elements, 9 wherein the vector modulator is configured to, when the selected polarization is right hand circular: generate a first excitation signal corresponding to the information signal; and generate a second excitation signal corresponding to the information signal phase shifted by about −90 degrees.

Example 10 includes the subject matter of examples 1, 2, and 3, including or omitting optional elements, wherein the vector modulator comprises two phase shifter-variable gain amplifier pairs having a gain of $\alpha_0$ and $\alpha_1$, respectively, further wherein the vector modulator is configured to, when the selected polarization is $$45 + \tan^{-1}\left(\frac{\alpha_1}{\alpha_0}\right):$$

generate a first excitation signal corresponding to the information signal having a normalized amplitude of $\alpha_0$; and generate a second excitation signal corresponding to the information signal having a normalized amplitude of $\alpha_1$.

Example 11 includes the subject matter of examples 1, 2, and 3, including or omitting optional elements, wherein the vector modulator comprises two phase shifter-variable gain amplifier pairs having a gain of $\alpha_0$ and $\alpha_1$, respectively, further wherein the vector modulator is configured to, when the selected polarization is $$45 - \tan^{-1}\left(\frac{\alpha_1}{\alpha_0}\right):$$

generate a first excitation signal corresponding to the information signal having a normalized amplitude of $\alpha_0$; and generate a second excitation signal corresponding to the information signal having a normalized amplitude of $\alpha_1$ and phase shifted by about 180 degrees.

Example 12 includes the subject matter of examples 1, 2, and 3, including or omitting optional elements, wherein the vector modulator is configured to drive the quad polarization antenna cell by simultaneously applying the plurality of excitation signals to the quad polarization antenna cell.

Example 13 is a quad polarization antenna cell configured to transmit or receive an RF signal, including: at least one square patch element, wherein a first diagonal is defined between a first corner and a second corner, wherein the first corner and the second corner are non-adjacent, and wherein a second diagonal is defined between a third corner and a fourth corner, wherein the third corner and the fourth corner are non-adjacent; a first port coupled to the first corner, wherein the first port is configured to apply a first excitation signal to the at least one square patch element; and a second port coupled to the third corner, wherein the second port is configured to apply a second excitation signal to the at least one square patch element.

Example 14 includes the subject matter of example 13, including or omitting optional elements, wherein the quad polarization antenna cell is configured to polarize the RF signal according to a polarization selected from vertical, horizontal, right hand circular, or left hand circular, in response to simultaneous application of the first excitation signal and the second excitation signal to the first port and the second port, respectively.

Example 15 includes the subject matter of examples 13 and 14, including or omitting optional elements, including two stacked square patch elements electromagnetically coupled to one another.

Example 16 includes the subject matter of examples 13 and 14, including or omitting optional elements, including a grounded cavity ring that surrounds the at least one square patch element.

Example 17 includes the subject matter of examples 13 and 14, including or omitting optional elements, wherein a side length of the at least one square patch element is about one half of a wavelength of the RF signal.

Example 18 is a method for driving a quad polarization antenna cell, including: inputting a selection signal, wherein the selection signal corresponds to a polarization selected from at least vertical, horizontal, right hand circular, and left hand circular polarization; modifying an information signal based at least on the selection signal to generate an excitation signal, wherein the information signal encodes information being communicated to an intended receiver of the RF signal transmitted by the quad polarization antenna cell; and driving the quad polarization antenna cell with the excitation signal to cause the quad polarization antenna cell to transmit/receive an RF signal that is polarized according to the selected polarization.

Example 19 includes the subject matter of example 18, including or omitting optional elements, wherein the selection signal comprises a first gain value and first phase shift value and a second gain value and a second phase shift value, the method further including: adjusting the phase and amplitude of a first instance of the information signal according to the first gain value and the first phase shift value to generate a first excitation signal; adjusting the phase and amplitude of a second instance of the information signal according to the second gain value and the second phase shift value to generate a second excitation signal; and driving the quad polarization antenna cell with the first excitation signal and the second excitation signal simultaneously.

Example 20 includes the subject matter of example 18, including or omitting optional elements, including driving the quad polarization antenna cell by applying the first excitation signal to a first port of the quad polarization antenna cell and applying the second excitation signal to a second port quad polarization antenna cell, wherein the first port and the second port are electrically coupled to adjacent corners of a square patch element in the quad polarization antenna cell.

Example 21 is a user equipment device, configured to transmit/receive an RF signal, including: a plurality of quad polarization antenna cells, wherein each quad polarization antenna cell is configured to polarize the RF signal in a selected one of at least vertical, horizontal, right hand circular, and left hand circular polarization; a plurality of vector modulators, wherein each vector modulator is connected to one of the quad polarization antenna cells, wherein each vector modulator is configured to: generate a plurality of excitation signals that, when applied to the quad polarization antenna cell, will polarize the RF signal according to the selected polarization; and drive the quad polarization antenna cell with the plurality of excitation signals.

Example 22 includes the subject matter of example 21, including or omitting optional elements, wherein the vector modulators are configured to drive the quad polarization antenna cells with the plurality of signals simultaneously.

Example 23 includes the subject matter of examples 21 and 22, including or omitting optional elements, wherein each quad polarization antenna cell includes: at least one square patch element, wherein a first diagonal is defined between a first corner and a second corner, wherein the first corner and the second corner are non-adjacent, and wherein a second diagonal is defined between a third corner and a fourth corner, wherein the third corner and the fourth corner are non-adjacent; a first port coupled to the first corner, wherein the first port is configured to conduct a first excitation signal of the two excitation signals to the at least one square patch element; and a second port coupled to the third corner, wherein the second port is configured to conduct a second excitation signal of the two excitation signals to the at least one square patch element.

Example 24 includes the subject matter of examples 21 and 22, including or omitting optional elements, wherein each vector modulator comprises a plurality of phase shifter-variable gain amplifier pairs, wherein each phase shifter-variable gain amplifier pair modifies an instance of the information signal to generate one of the plurality of excitation signals.

Example 25 is an apparatus, including: means for adjusting the phase and amplitude of a first instance of the information signal according to the first gain value and the first phase shift value to generate a first excitation signal; means for adjusting the phase and amplitude of a second instance of the information signal according to the second gain value and the second phase shift value to generate a second excitation signal; and means for driving the quad polarization antenna cell with the first excitation signal and the second excitation signal simultaneously.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:

1. A transceiver comprising:
   a phased array antenna having a plurality of quad polarization antenna cells;
   a vector modulator configured to:
      determine a first selected polarization for a first information signal corresponding to either vertical, horizontal, right hand circular, or left hand circular;
      modify the first information signal to generate a first two excitation signals based on the first selected polarization;
      apply the first two excitation signals to a radiating element of one of the plurality of quad polarization antenna cells to cause the quad polarization antenna cell to transmit the first information signal having the first selected polarization;
      determine a second selected polarization for a second information signal corresponding to either vertical, horizontal, right hand circular, or left hand circular, wherein the first selected polarization is different from the second selected polarization;
      modify the second information signal to generate a second two excitation signals based on the second selected polarization; and
      apply the second two excitation signals to the radiating element of one of the plurality of quad polarization antenna cells to cause the quad polarization antenna cell to transmit the second information signal having the second selected polarization.

2. The transceiver of claim 1, wherein the vector modulator is configured to:
   modify the first information signal based on a first beamforming signal to generate the first two excitation signals; and
   modify the second information signal based on a second beamforming signal to generate the second two excitation signals.

3. The transceiver of claim 1, wherein the vector modulator comprises a plurality of phase shifter-variable gain amplifier pairs, wherein each phase shifter-variable gain amplifier pair modifies i) an instance of the first information signal to generate one of the first two excitation signals and ii) an instance of the second information signal to generate one of the second two excitation signals.

4. The transceiver of claim 1, wherein the vector modulator is further configured to operate at an RF frequency of the transceiver.

5. The transceiver of claim 1, wherein the vector modulator is further configured to operate at an IF frequency of the transceiver.

6. The transceiver of claim 1, wherein the vector modulator is configured to, when the first selected polarization is vertical:
   generate a first excitation signal in the first two excitation signals corresponding to the information signal; and
   generate a second excitation signal in the first two excitation signals corresponding to the information signal.

7. The transceiver of claim 1, wherein the vector modulator is further configured to, when the first selected polarization is horizontal:
   generate a first excitation signal in the first two excitation signals corresponding to the information signal; and
   generate a second excitation signal in the first two excitation signals corresponding to the information signal phase shifted by about 180 degrees.

8. The transceiver of claim 1, wherein the vector modulator is configured to, when the first selected polarization is left hand circular:
   generate a first excitation signal in the first two excitation signals corresponding to the information signal; and
   generate a second excitation signal in the first two excitation signals corresponding to the information signal phase shifted by about 90 degrees.

9. The transceiver of claim 1, wherein the vector modulator is configured to, when the first selected polarization is right hand circular:
   generate a first excitation signal in the first two excitation signals corresponding to the information signal; and
   generate a second excitation signal in the first two excitation signals corresponding to the information signal phase shifted by about −90 degrees.

10. The transceiver of claim 1, wherein the vector modulator comprises two phase shifter-variable gain amplifier pairs having a gain of $\alpha_0$ and $\alpha_1$, respectively, further wherein the vector modulator is configured to, when the first selected polarization is $$45 + \tan^{-1}\left(\frac{\alpha_1}{\alpha_0}\right):$$

generate a first excitation signal in the first two excitation signals corresponding to the information signal having a normalized amplitude of $\alpha_0$; and
   generate a second excitation signal in the first two excitation signals corresponding to the information signal having a normalized amplitude of $\alpha_1$.

11. The transceiver of claim 1, wherein the vector modulator comprises two phase shifter-variable gain amplifier pairs having a gain of $\alpha_0$ and $\alpha_1$, respectively, further wherein the vector modulator is configured to, when the first selected polarization is $$45 - \tan^{-1}\left(\frac{\alpha_1}{\alpha_0}\right):$$

generate a first excitation signal in the first two excitation signals corresponding to the information signal having a normalized amplitude of $\alpha_0$; and
   generate a second excitation signal in the first two excitation signals corresponding to the information signal having a normalized amplitude of $\alpha_1$ and phase shifted by about 180 degrees.

12. The transceiver of claim 1, wherein the vector modulator is configured to drive the quad polarization antenna cell by simultaneously applying the first two excitation signals to the quad polarization antenna cell and then simultaneously applying the second two excitation signals to the quad polarization antenna cell.

13. A method comprising:
   determining a first selected polarization for a first information signal corresponding to either vertical, horizontal, right hand circular, or left hand circular;
   modifying the first information signal to generate a first two excitation signals based on the first selected polarization;
   applying the first two excitation signals to a radiating element of a quad polarization antenna cell to cause the quad polarization antenna cell to transmit the first information signal having the first selected polarization;

determining a second selected polarization for a second information signal corresponding to either vertical, horizontal, right hand circular, or left hand circular, wherein the first selected polarization is different from the second selected polarization;

modifying the second information signal to generate a second two excitation signals based on the second selected polarization; and applying the second two excitation signals to the radiating element of the quad polarization antenna cell to cause the quad polarization antenna cell to transmit the second information signal having the second selected polarization.

14. The method of claim 13, comprising:
modifying the first information signal based on a first beamforming signal to generate the first two excitation signals; and
modifying the second information signal based on a second beamforming signal to generate the second two excitation signals.

15. The method of claim 13, comprising when the first selected polarization is vertical:
generating a first excitation signal in the first two excitation signals corresponding to the information signal; and
generating a second excitation signal in the first two excitation signals corresponding to the information signal.

16. The method of claim 13, comprising when the first selected polarization is horizontal:
generating a first excitation signal in the first two excitation signals corresponding to the information signal; and
generating a second excitation signal in the first two excitation signals corresponding to the information signal phase shifted by about 180 degrees.

17. The method of claim 13, comprising when the first selected polarization is left hand circular:
generating a first excitation signal in the first two excitation signals corresponding to the information signal; and
generating a second excitation signal in the first two excitation signals corresponding to the information signal phase shifted by about 90 degrees.

18. The method of claim 13, comprising when the first selected polarization is right hand circular:
generating a first excitation signal in the first two excitation signals corresponding to the information signal; and
generating a second excitation signal in the first two excitation signals corresponding to the information signal phase shifted by about −90 degrees.

19. The method of claim 13, comprising when the first selected polarization is $$45 + \tan^{-1}\left(\frac{\alpha_1}{\alpha_0}\right):$$

generating a first excitation signal in the first two excitation signals corresponding to the information signal having a normalized amplitude of $\alpha_0$; and
generating a second excitation signal in the first two excitation signals corresponding to the information signal having a normalized amplitude of $\alpha_1$.

20. The method of claim 13, comprising when the first selected polarization is $$45 - \tan^{-1}\left(\frac{\alpha_1}{\alpha_0}\right):$$

generating a first excitation signal in the first two excitation signals corresponding to the information signal having a normalized amplitude of $\alpha_0$; and
generating a second excitation signal in the first two excitation signals corresponding to the information signal having a normalized amplitude of $\alpha_1$ and phase shifted by about 180 degrees.

21. The method of claim 13, comprising:
simultaneously applying the first two excitation signals to the quad polarization antenna cell; and
then simultaneously applying the second two excitation signals to the quad polarization antenna cell.

* * * * *